G. W. BULLEY.
AUTOMATIC COUPLING FOR TRACKLESS VEHICLES.
APPLICATION FILED DEC. 13, 1915.
1,277,187.
Patented Aug. 27, 1918.
2 SHEETS—SHEET 1.
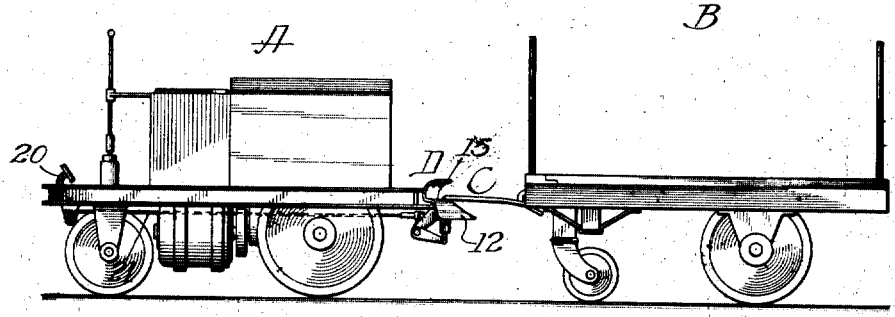
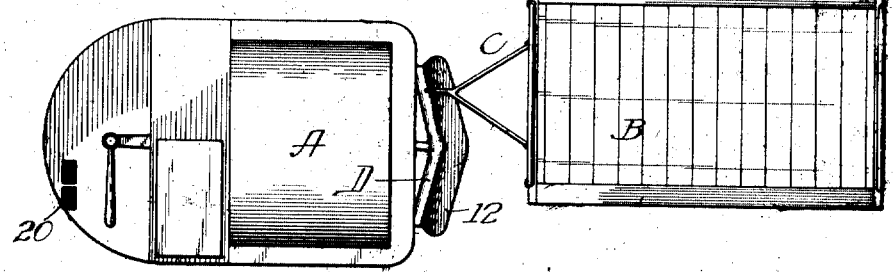
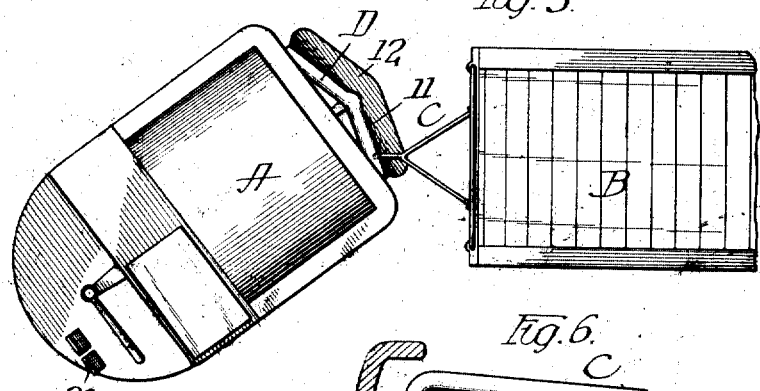
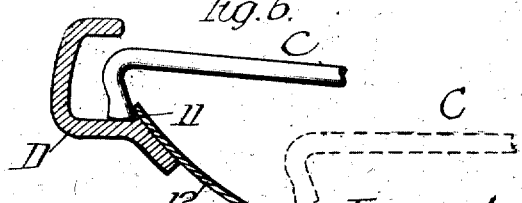

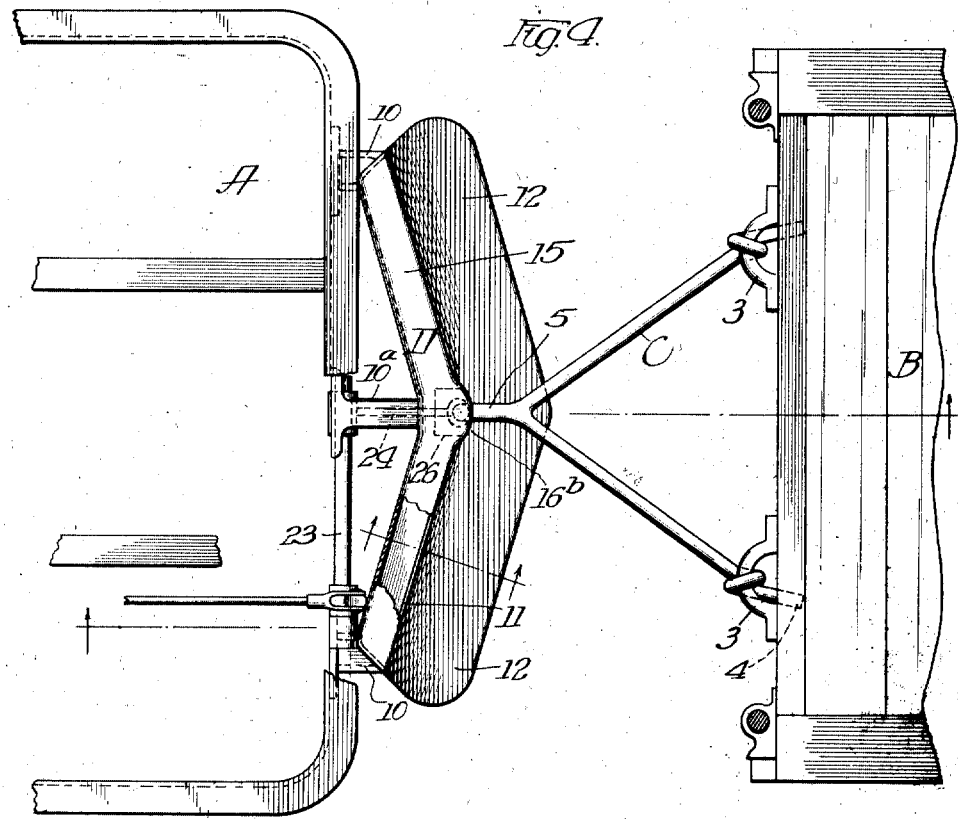
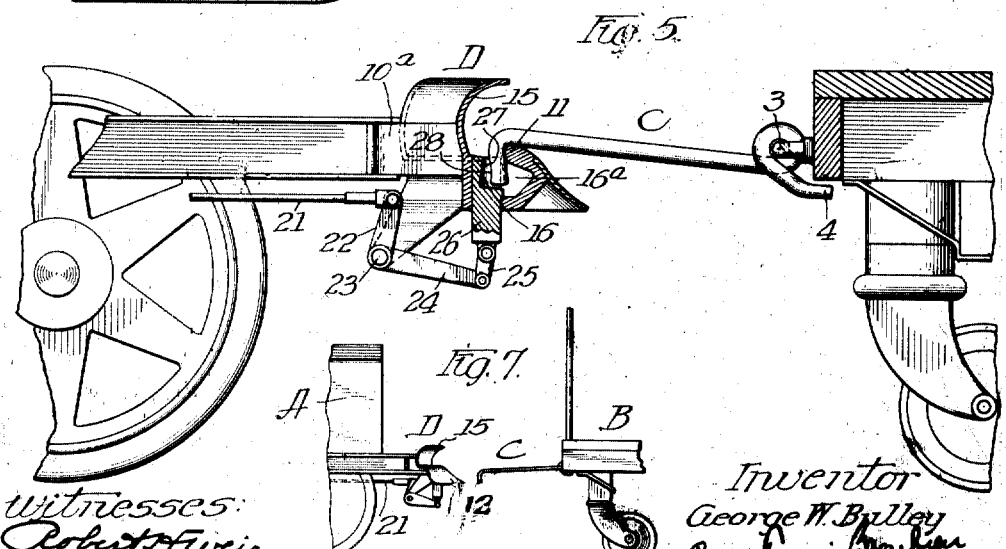

UNITED STATES PATENT OFFICE.

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

AUTOMATIC COUPLING FOR TRACKLESS VEHICLES.

1,277,187.  Specification of Letters Patent.  Patented Aug. 27, 1918.

Application filed December 13, 1915. Serial No. 66,569.

*To all whom it may concern:*

Be it known that I, GEORGE W. BULLEY, a citizen of the United States of America, and resident of Chicago, Cook county, Illinois, have invented a certain new and useful Improvement in Automatic Couplings for Trackless Vehicles, of which the following is a specification.

My invention relates to improvements in automatic couplers for trackless vehicles.

One of the objects of my invention is to provide an improved coupler which is adaptable to vehicles which are not confined to any definite line of travel; that is to say vehicles such as tractors, trucks and the like which are not intended or designed to travel on rails or tracks.

Another object of my invention is to provide an improved coupler which will be capable of automatically connecting in train relation two vehicles regardless of the angular relative position which said vehicles may happen to be in.

Another object of my invention is to provide an automatic coupler of this character which will be simple, durable and reliable in construction, and effective and efficient in operation.

Other objects of my invention will appear hereinafter.

My invention consists in the features of novelty exemplified in the construction, combination and arrangement of parts herein described, shown in the accompanying drawings and more particularly set forth in the appended claims.

Referring to the drawings:

Figure 1 is a view in elevation of a tractor or power propelled vehicle and a truck or trailer connected in train relation by an improved automatic coupler embodying my invention;

Fig. 2 is a top plan view of the structure shown in Fig. 1, but showing the two vehicles out of alinement or offset laterally.

Fig. 3 is a view of the vehicles shown in Fig. 2, but disposed at an angle to illustrate the coupling range of my improved structure;

Fig. 4 is a plan view of the adjacent end portions of the vehicles and of my improved coupler structure;

Fig. 5 is a sectional view taken substantially on the line 5—5 of Fig. 4;

Fig. 6 is a detail section on the line 6—6 of Fig. 4; and

Fig. 7 is a view in elevation of the adjacent end portions of the two vehicles in uncoupled position showing the normal position of the parts of the coupler.

It will be obvious to one skilled in the art, after having obtained an understanding of my invention from the disclosures herein made, that my invention is capable of embodiment in other or modified structures than that shown in the drawings without departing from the scope and spirit of the invention, and I wish it so understood.

In industrial haulage it is the general practice, especially where goods and merchandise are transferred from place to place in warehouses, railroad platforms, wharves and the like, or where vessels or railroad cars are loaded and unloaded, to use small trucks upon which the goods and merchandise are loaded and by which it is transported from place to place. It is the custom generally to provide trucks or vehicles of a character which can be pushed or propelled about the platforms or warehouses by men employed for that purpose. These trucks are designed so that they may be readily operated or propelled in any particular direction desired. In other words, their line of travel is not confined in any way to a definite direction by tracks or rails. I have devised a system for handling and manipulating vehicles of this character in which I connect together a number of these trucks in train relation and provide a tractor or locomotive, so to speak, for hauling the train of trucks from place to place as desired. In a system of this character the trucks must, of necessity, be connected by couplers to form a train, whether the train consists merely of the power unit or locomotive and a single trailer, or whether it consists of a pulling unit and a plurality of trailers. I find, however, that the ordinary coupler or coupling mechanism, such as used for railway cars or vehicles which travel along definite paths on rails, is entirely unadaptable and impractical for coupling together cars or trucks in industrial haulage when the cars or trucks are trackless; that is to say do not travel on rails. And one reason, among others, for this lies in the fact that, because the trains of trucks do not travel on rails, it is extremely difficult and inconvenient and involves a loss of time to line up these trucks and their tractor in such manner as to enable them to be coupled by the ordinary coupling mechanism. The trucks and tractors are just as likely to be standing in any angular or offset relation as they are to be in alinement. Again the train of trucks might have been coupled and standing in proper alinement but the locomotive or tractor out of alinement or perhaps even without room to properly line up for coupling. Such a condition as just mentioned is diagrammatically illustrated in Fig. 3 wherein the tractor is in an angularly offset position with respect to the trailer truck. It is readily seen that the ordinary coupler, which primarily requires proper alinement of the vehicles in order to be operable, would be entirely ineffective, in fact inoperable, to couple the vehicles together which are in such relative position as illustrated. The purpose of my invention is to provide a coupler which is especially adapted for coupling together trackless vehicles used in industrial haulage regardless of the particular relative position in which they may happen to be at the time it is desired to make the coupling. In these drawings I have illustrated a tractor A and a truck B which are intended to be representative of any of the various tractors and hand cars or trucks which are or may be used in industrial haulage, particularly where no tracks are employed for guiding these vehicles along definite lines. I have illustrated my improved coupler in connection with a tractor and one truck but it is understood that these couplers may be employed between any number of adjacent trucks which are to be assembled in train relation. In carrying out my invention I provide each truck with what might be called, for convenience, a hitch or draft member C which projects outwardly from the end of the truck a sufficient distance and in proper position to engage the coöperating parts of the coupling mechanism which are carried by the end of the adjacent vehicle, which in this instance is the tractor A. This hitch or draft member C, in this particular construction, is triangular or V-shaped and consists of a bar or member having its two ends attached to the truck. The ends of this member are attached to the truck by giving each of said ends a single turn about a loop shaped member 4 securely bolted or otherwise fastened to the end of the track, as shown clearly in Figs. 4 and 5. This arrangement forms a suitable pivotal connection between the draft member or hitch and the truck so that the draft member may freely swing within a certain range in a vertical plane. The ends 4 are continued, after being bent around the loop members 4, until they project beneath the front of the truck body so as to engage the body of the truck and act as stops to limit the downward movement of the hitch; that is so as to maintain the hitch in proper elevated position to engage the other coupler parts. This hitch or draft member may, if desired, be made elastic or resilient so that in operation it will yieldingly lower when the forward vehicle drops below the level of the trailing vehicle. In the structure shown, however, I prefer to make the draft member rigid so that its forward end cannot be depressed below a definite position which is determined by the limit stop ends 4, and to take care of the operating condition just mentioned in a manner hereinafter described. The loop members 3, to which the hitch member C is fastened are spaced apart at considerable distance on the truck so that the draft member will be substantially rigid in a lateral or horizontal direction. The two side portions of the hitch are merged at their outer ends in a single or common portion 5 which terminates in a downwardly turned end forming a substantial hook, as shown more clearly in Figs. 5 and 6. And in this case is it this hook which coöperates with the parts of the coupler mechanism carried by the preceding vehicle. The rear end of the tractor, which in this case is the preceding vehicle has a comparatively long grooved or troughed member D, which at its ends has foot members or brackets 10 securely bolted or otherwise fastened to the rear edge of the truck body, this trough member being disposed so that the opening or mouth thereof throughout its entire length faces substantially rearwardly. A brace member 10ª is also provided at the central portion of said trough member to further strengthen the structure. On its lower rear edge, however, it has a continuous lip or flange 11 which is engageable by the hooked end of the hitch member. This raised lip or flange forms a trough or groove in the lower portion of the trough member D, and when the hook is engaged in behind the lip a coupling connection is effected between the two vehicles sufficient to draw the trailing vehicle along. But in order that the hook may properly and automatically be entered into this trough member I provide a broad apron or deflector 12 which projects downwardly and rearwardly from the lip. In fact, in this particular construction the lip or flange 11 is preferably formed by the upper edge of the deflector apron 12, this deflector apron being made as a separate member and securely fastened by welding or otherwise to the trough member D. It may, if desired, be formed integral with the trough member D. The deflector apron is as long, and in fact somewhat longer that the trough member so that it, together with the trough member, may be said to occupy substantially the width of the tractor body. The parts are so proportioned that the deflector apron as shown in Fig. 7 depends below the lowest position at which the hook portion of the draft member is normally maintained by the stops 4 when the vehicles are not coupled together. When the hook portion is in engagement with the lip 11 it is elevated somewhat above its normal position thus allowing for variations in the relative levels of the two vehicles when in operation. Thus it is obvious that when the vehicle is backed up toward the truck or the truck moved forward toward the tractor the hook portion of the draft member C will strike the deflector and the deflector will direct or guide it upwardly and into the trough member where the hook may then drop into engagement behind the lip or flange 11 and couple the vehicles together. This automatic coupling operation occurs at whatever point the hooked portion strikes or engages the deflector apron without regard to the offset or angular relation in which the two vehicles may happen to be with respect to each other. This gives a wide, and in fact what might be termed a universal range of coupling effectiveness to the structure. The vehicles may be offset laterally (Fig. 7) with respect to each other to an extent substantially the width of the deflector apron and still be in coupling relation, and this range is increased when the vehicles are not only offset but angularly disposed, as shown for instance in Fig. 3. It is desirable, however, that after the coupling operation has been effected the draft should take place along the longitudinal center of the vehicles while the vehicles are traveling and I therefore arrange the structure so that the couplings will automatically center themselves along this longitudinal or central axis. To this end I make the trough member B and the deflector apron 12 of angular conformation; that is the trough member and deflector are tapered or bowed, so to speak, rearwardly, the center or rearmost point coinciding with the central longitudinal axis of the vehicle as shown clearly in Figs. 2, 3 and 4. And this taper or angularity of the trough member is sufficient so that after a coupling connection has been effected between the hitch and trough member at any point throughout the width of the trough member, the draft or pull applied by the tractor to the coupler, together with the resistance offered by the truck will operate to cause the hook to slide or shift along the trough member D until it centers itself; that is until it reaches a central point in the width of the trough member. The tractor operator need not pay any particular attention to the position of his tractor relatively to the truck. He simply backs the tractor generally toward the truck until the hook or draft member is deflected or guided into coupling relation to member D, and then starts in the general direction in which the tractor is headed and the hitch or draft member will automatically shift into a central position and properly aline the trucks in train relation. During operation there might be a tendency for the train to buckle and uncouple the connection due to sudden variations in the pull on the coupler or various other causes well known in train operation, but this is prevented by the trough member D, particularly its inner or forward wall 15, which turns rearwardly and overhangs the trough. This serves as an abutment and prevents the draft member from being thrown out of the trough, the space between the overhanging portion of the rear wall and the lip or flange 11 being just sufficient to permit the entrance and exit of the hook. An advantage of this particular construction is that there is practically no lost motion between the hitch member C and the coupler member D. Having once assumed an alined position, however, it is desirable that this relation be maintained while the train is traveling and particularly while turning curves. I therefore provide a deeper socket or depression 16 at the center of the trough member D, into which socket or depression the hook may drop after having reached this position. It cannot then shift laterally but at the same time will have a pivotal movement when the train turns curves. The hook is inclined rearwardly so as to insure its remaining in firm engagement not only with the lip or rim 11 but also with the socket 16, the rearward portion 16$^a$ of which is undercut or hollowed out accordingly. Furthermore the rear upper edge 16 of the socket at the central portion is bowed to a slightly greater degree which assists in preventing the lateral movement of the hook from its central position.

It is obvious that when the trailer truck is to be uncoupled the operator may simply take hold of the hitch or draft member and raise the hook out of engagement with the socket 16, but I prefer that he shall be enabled to uncouple the mechanism without leaving his seat on the tractor. I therefore provide a treadle 20 on the forward platform of the tractor convenient to the operator's feet. This treadle lever is connected by a link or pull rod 21 to the lever or arm 22, which is mounted on a rock shaft 23. This shaft is journaled in suitable depending bracket bearings fastened to the tractor body just forward of the coupler member D. The rock shaft carries another arm 24 which is connected by a small link 25 to the lower end of a plunger or release trip 26. This plunger is reciprocable, by the mechanism just described, in the bottom of said socket 16, and hence said upper end is positioned just below the end of the hook. Thus when the operator presses the treadle he will raise the trip member 26 and force the hook upwardly until it clears the top of the socket 16 and thereby frees the hook which will withdraw from the trough member D upon a slight forward movement of the tractor; when the operator releases the pressure upon the treadle the trip member will return to normal position. The socket 16 in fact is formed partially by a depression or notch in the upper end of the plunger trip 26 and the wall 27 of this notch is undercut or tapered downwardly. In like manner the forward space or portion 28 of the hook is correspondingly formed to coöperate with the undercut wall 27 and the purpose of this arrangement is to provide a locking action between the hook and its socket, especially when the train tends to buckle up; this prevents the hook from being forced out of the socket when the train does buckle.

What I claim as my invention is:

1. The combination of a broad coupler member having angularly disposed portions meeting at substantially central point to provide a comparatively wide coupling range, a coöperating hitch member capable of engaging said coupler member at any point in said range and at various angles with respect thereto, means for automatically centering the hitch member with respect to the coupler member after having engaged said coupler member, and a lock for holding the hitch member against shifting from its central position with respect to the coupler.

2. The combination of a pair of vehicles, a hitch member carried by one of said vehicles and normally maintained in a definite position, a comparatively wide coupler member carried by the other vehicle and having means engageable by said hitch at any point in the width of said coupler member, a guide for deflecting the hitch into engagement with the coupler member when the vehicles are moved relatively toward each other, means for automatically shifting the coupler member and the hitch into relatively central position when the vehicles are moved relatively apart from each other, and a lock operable to retain the hitch in its centralized position and means for actuating said lock to disengage the hitch member from the coupler member.

3. In an automatic coupler for trackless vehicles, the combination of a wide range coupler member embodying the horizontally arranged ledges extending the width of the coupler member and converging angularly toward an intermediate point, a draw-bar member mounted for vertical movement and having its end formed to engage said ledges at any point in their length and at various angles with respect thereto, and adapted to shift along said ledges while engaged therewith to said intermediate point when the coupler member and draw-bar member are moved relatively from each other, and means at said intermediate point for holding the draw bar member therein against longitudinal and lateral displacement.

4. In an automatic coupler for trackless vehicles, the combination of a wide range coupler member embodying the horizontally arranged ledges extending the width of the coupler member and converging angularly toward an intermediate point, a draw-bar member having its end formed to engage said ledges at any point in their length and at various angles with respect thereto, and adapted to shift along said ledges while engaged therewith to said intermediate point when the coupler member and draw-bar member are moved relatively from each other, means at said point for holding the draw-bar member therein against lateral and longitudinal displacement, and a manually operated device at said intermediate point for actuating said draw-bar member to disengage said draw-bar member and coupler member.

5. The combination of two trackless vehicles adapted to be operated in train alinement, and coupling mechanism of said vehicles capable of coupling said vehicles together regardless of their relative position with respect to train alinement and embodying angularly disposed shouldered portions carried by one of said vehicles extending transversely of the width of the vehicle in a substantially horizontal plane, a vertically movable draw-bar member on the other vehicle having a hooked end normally maintained in a plane parallel to but separated from the plane of the shouldered portions and adapted to engage said shouldered portions at any point in their length and to shift to a central position when the vehicles are moved relatively from each other, and an apron disposed along the length of said shouldered portions adapted to deflect the draw-bar member from its normal plane into engagement with said shoulder in the act of coupling the vehicles together.

6. The combination of two trackless vehicles adapted to be operated in train alinement, and coupling mechanism of said vehicles capable of coupling said vehicles together regardless of their relative position with respect to train alinement and embodying angularly disposed shouldered portions carried by one of said vehicles extending transversely of the width of the vehicle in a substantially horizontal plane, a vertically movable draw-bar member on the other vehicle having a hooked end normally maintained in a plane parallel to but separated from the plane of the shouldered portions and adapted to engage said shouldered portions at any point in their length and to shift to a central position when the vehicles are moved relatively from each other, an apron disposed along the length of said shouldered portions adapted to deflect the draw-bar member from its normal plane into engagement with said shoulder in the act of coupling the vehicles together, and a guard overhanging said shouldered portions to prevent the disengagement of the draw-bar member with respect to said shouldered portions.

Signed by me at Chicago, Illinois, this 7th day of December, 1915.

GEORGE W. BULLEY.

Witnesses:
H. A. SWENATON,
AMY JEHLE.